(12) United States Patent
Dittrich

(10) Patent No.: US 8,726,025 B2
(45) Date of Patent: May 13, 2014

(54) SECURED CRITICAL INFORMATION STORAGE AND TRANSACTION

(75) Inventor: Wolfgang Dittrich, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/553,501

(22) Filed: Jul. 19, 2012

(65) Prior Publication Data

US 2014/0025959 A1   Jan. 23, 2014

(51) Int. Cl.
*G06F 21/00* (2013.01)

(52) U.S. Cl.
USPC .............................. 713/172; 380/28; 705/78

(58) Field of Classification Search
None
See application file for complete search history.

(56) References Cited

U.S. PATENT DOCUMENTS

2008/0010203 A1*  1/2008  Grant .............................. 705/44
2008/0065665 A1*  3/2008  Pomroy et al. ................ 707/101

* cited by examiner

*Primary Examiner* — Gilberto Barron, Jr.
*Assistant Examiner* — Simon Kanaan
(74) *Attorney, Agent, or Firm* — Kenyon & Kenyon LLP

(57) ABSTRACT

An enterprise system includes a storage having stored thereon a private key and a processor that is configured to receive a data object including an encrypted datum; decrypt the encrypted data based on the private key to generate a first string of digits, each digit including N bits, wherein N is a positive integer; shuffle the N bits of the each digit according to a pre-determined pattern of bit positions to generate a second string of digits; and substitute a subset of the N bits of the each digit with pre-determined bits to generate a third string of digits.

17 Claims, 8 Drawing Sheets

SECURED CRITICAL INFORMATION STORAGE AND TRANSACTION

FIELD OF THE INVENTION

The present invention is directed to systems and methods for storing and transacting critical information in enterprise systems, in particular, directed to a system and method for storing and transacting credit card information among the credit card issuer, the enterprise, a cloud service provider, and a bank.

BACKGROUND

Enterprise business applications (such as a travel reimburse component in a financial application) need to store and process certain critical information (such as credit card number) to fulfill business objectives. For example, the travel reimburse component of an enterprise system may need to access the credit card number in order to process a travel reimbursement request from an employee. For security reasons and to comply with regulations, the business application that stores and processes credit card information need to adhere to Payment Card Industry (PCI) standards. The adherence to PCI standards may incur additional costs due to the required certification and specific operational procedures.

FIG. 1 illustrates a credit card information transaction in the context of enterprise business application, specifically, business travel reimbursement. Several parties may be involved in the transaction. In this example, the parties include a credit card company 102, a third party 104, an enterprise 106, and a bank 108. The enterprise may even decide to delegate operating part of the business process to a further party such as a cloud service provider. The credit card company 102 issues business credit cards to the employees of the enterprise 106 so that an employee may use the credit card for business expenses such as travel expenses. After the employee reports business expenses to the enterprise and the expenses are processed and approved by the enterprise, the enterprise may request the bank 108 to distribute reimbursement to the employee and pay the outstanding balance on the credit card account to the credit card company. To secure the credit card information and comply with PCI standards, a third party token provider 110 may be used to store the credit card data and to substitute credit card data with tokens. Details of this approach is discussed in the following.

As shown in FIG. 1, a credit card company 102 may issue a business credit card to an employee of an enterprise 106. However, due to security and compliance reasons, the enterprise may not store the credit card data in its business system. Instead, a third party token provider who is certified under PCI standards to store credit card data may receive and store the credit card data on behalf of the enterprise, and use a tokenization component 112 to generate a token for each stored credit card data. The generated token does not contain information related to the credit card data. However, a token retrieval request originated from the backend business applications may be used to retrieve the credit card data from the third party token provider 110 through de-tokenization component 114.

The enterprise 106 may use business applications that includes a front end business application 116 and backend business applications 120.1, 120.2. The front end business application 116 may be a travel expense reimbursement solution which may provide an interface (not shown) for employees to enter business expenses including expenses incurred on the business credit card. Further, the front end business application 116 may be coupled to a storage device 118 for storing tokens. Each token may be assigned to a particular employee to replace his credit card data. The backend business applications may be financial applications that handle monetary transactions between the enterprise 106 and bank 108. The backend business application may include a credit card data request function 122.1 or 122.2 which send tokens to the de-tokenization module 114 of the third party token provider 110 which may retrieve credit card data and transmit the credit card data to the backend business applications 120.1, 120.2. Using the credit card data, the backend business applications 120.1, 120.2 may request the bank 208 to pay a certain amount of money to the account at the credit card company 102.

In operation, the credit card company 102 sends usage data of an employee of enterprise (or customer) 106 to the third party token provider 110. The third party token provider substitutes the credit card number with a token before the credit card information is sent to the business applications. The business application includes a front end business application 116 that stores the received token in the token storage 118 and calculates the reimburse amount to the employee and an outstanding balance owned to the credit card company. Subsequently, the front end 116 transmits the calculated amount and balance, token, and employee identification to the backend business application 120 (such as a financial system). Since the credit card number is obfuscated by using the token, the backend 120 transmits the token through a secured network to the third party 110 which provides a de-tokenization service 114 that returns a credit card number for the token. The third party 110 is a remote service provider that is physically separate from the enterprise. Finally, the backend 120 triggers the bank 108 to pay the outstanding balance in reference to the credit card number to the account at the credit card company 102.

In the system as shown in FIG. 1, each transaction requires the transmission of a token to the third party, which is a costly proposition.

BRIEF DESCRIPTION OF THE DRAWINGS OF THE EXAMPLE EMBODIMENTS

DETAILED DESCRIPTION OF THE EXAMPLE EMBODIMENTS

Current art uses a third party token provider and exchanges tokens between the enterprise and the third party to secure critical information. Since the usage of tokens to secure critical information is expensive, there is a need for systems and methods that comply with the regulation without the cost of transmitting the tokens.

Embodiments of the present invention may include a system and method that uses encryption to secure critical information such as credit card data on enterprise system. Embodiments of the present invention may further include a system and method that masks critical information prior to encryption. By using the system and method of encryption and cloak, embodiments of the present invention may store the secured critical information on the enterprise system whereby the enterprise system may recover for the critical information on the enterprise system without exchanging tokens between the enterprise system and a third party, thus reducing the cost of critical information storage and transmission in the enterprise system.

Embodiments of the present invention may include a cloaking method that includes the steps of receiving a data object including a first string of digits, each digit including N bits, where N is a positive integer; substituting a subset of the N bits of the each digit with random bits; shuffling the N bits of the each digit according a pre-determined pattern of bit positions to generate a second string of digits; encrypting the second string to generate an encrypted datum; and transmitting a second data object including the encrypted data to an enterprise system for storage.

Embodiments of the present invention may include a de-cloaking method that includes receiving a data object including an encrypted datum; decrypting the encrypted data to generate a first string of digits, each digit including N bits, where N is a positive integer; shuffling the N bits of the each digit according a pre-determined pattern of bit positions to generate a second string of digits; and substituting a subset of the N bits of the each digit with pre-determined bits to generate a third string of digits.

Embodiments of the present invention may include an enterprise system that includes a storage having stored thereon a private key and a processor that is configured to receive a data object including an encrypted datum; decrypt the encrypted data based on the private key to generate a first string of digits, each digit including N bits, where N is a positive integer; shuffle the N bits of the each digit according a pre-determined pattern of bit positions to generate a second string of digits; and substitute a subset of the N bits of the each digit with pre-determined bits to generate a third string of digits.

Figure 1:
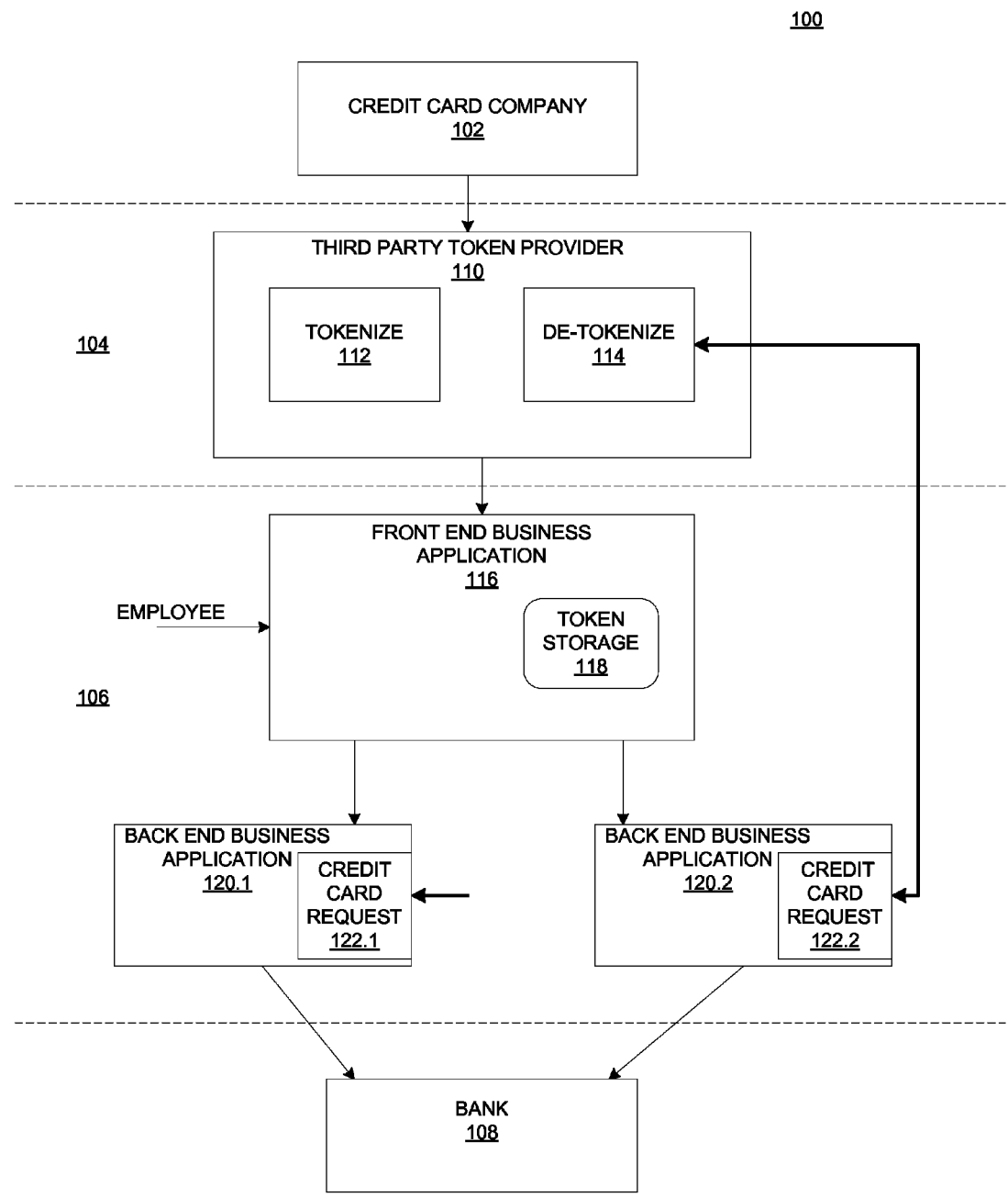
FIG. 1 illustrates a system for credit card information transaction.
Figure 2:
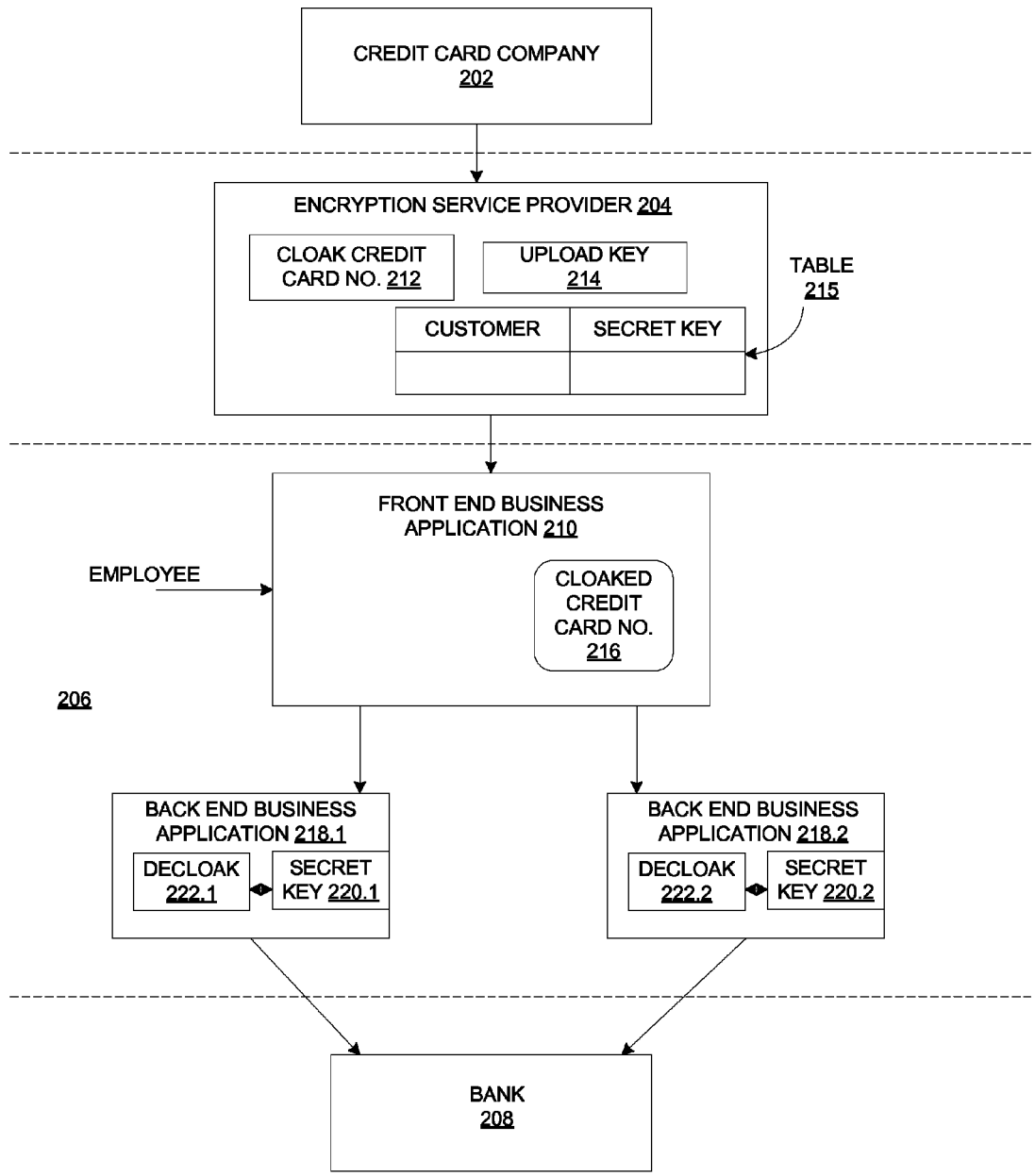
FIG. 2 is a system for storing and transmitting critical information on an enterprise system according to an embodiment of the present invention.

FIG. 2 is a system for storing and transmitting critical information on an enterprise system according to an embodiment of the present invention. The system 200 may involve a credit card company 202, an encryption service provider 204, an enterprise 206, and a bank 208. The enterprise may even decide to delegate operating part of the business process to a further party such as a cloud service provider. The credit card company 202 may issue business credit cards to employees of the enterprise and record credit card transactions of employees. The encryption service provider 204 may mask critical information such as credit card data and encrypt the cloaked critical information. To encrypt, the enterprise service provider 204 may be equipped with a hardware processor that may be configured with a module 212 for cloaking and encrypting credit card numbers, and an upload module 214 for uploading encryption keys and a table 215 for storing the identification of customers and the secret keys assigned to them.

The cloaking of the critical information is designed to comply with regulations so that the critical information may be securely stored in an enterprise system 206. A front end business application 210 of the enterprise system 206 may be coupled to a storage 216 having stored thereon the secured critical information such as credit card numbers. The enterprise system 206 may also include backend business applications 218.1, 218.2 that are communicatively coupled to the front end business application 210. The front end business application may be deployed on premise or on demand in a cloud. The backend business applications may be ported on a server which includes a hardware processor that is configured with de-cloak modules 222.1, 222.2. The de-cloak modules 222.1, 222.2 may be coupled to storages 220.1, 220.2 having stored thereon secret keys for decryption. Thus, the de-cloak modules 222.1, 222.2 may first decrypt the secured critical information received from the storage 216 of the front end business application 210. Further, the decode modules 220.1, 220.2 may de-cloak the decrypted data to restore the credit card number. The backend business applications 218.1, 218.2 may transmit the credit number to the bank so that the bank may disburse payments to the credit card company.

In one embodiment, a private key encryption method such as a 128 bit method according the Advanced Encryption Standard (AES) may be used to encrypt critical information. However, embodiments of the present invention are not limited by a particular encryption method. Other types of encryption method may also be used for encrypting critical information. As a preliminary step, a private key may be exchanged between the encryption service provider 204 and the backend business applications 218 of the enterprise system 206. In one embodiment, the key can only be transmitted between the encryption service provider 204 and the backend business applications 218 while the front end business application 116 cannot access the private key. Thus, both the encryption service provider 204 and the backend business applications 218.1, 218.2 have access to the same private keys with respect to the same employees.

In operation, in response to a request by an enterprise, the credit card company may transmit a data object including credit card usage data of an employee of the enterprise customer to the encryption service provider 204. At the encryption servicer provider 204, a hardware processor may be configured to substitute the credit card number with a cloaked number using a cloaking method. Embodiments of the cloaking method are discussed below. The cloaked number that substitutes the credit card number is transmitted to the enterprise system 206. A front end business application 210 may store the cloaked number in a storage 216 and calculate a monetary amount incurred by the employee. The monetary amount may include the out-of-pocket expenses by the employee and an outstanding balance on the credit card. The front end business application 210 may send the cloaked number, the monetary amount, and the employee identification to the backend business applications 218.1, 218.2. The backend business applications 218.1, 218.2 may be configured with de-cloak modules 222.1, 222.2 that may convert the cloaked number back into the credit card number. The backend business application 218.1, 218.2 of the enterprise system 206 may transmit the credit card number to the bank 208 to trigger the payment to the outstanding balance to the credit card company in reference to the credit card number. Thus, expenditures by the employee may be reimbursed to the credit card company.

Figure 3:
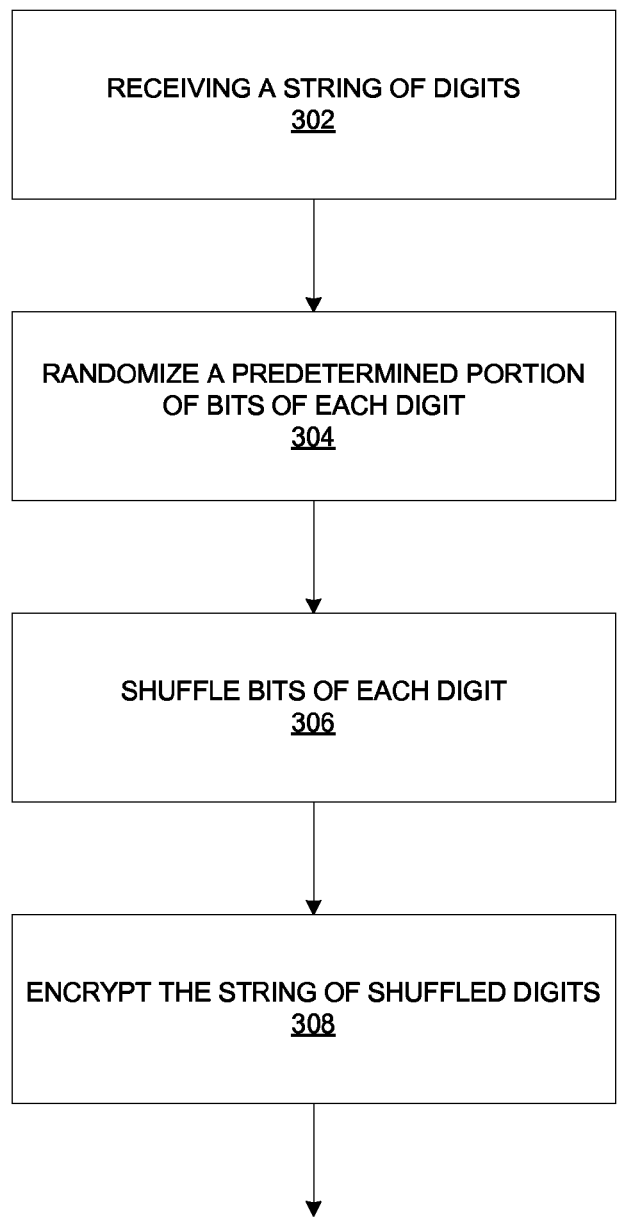
FIG. 3 illustrates a process to cloak critical data according to an embodiment of the present invention.

FIG. 3 illustrates a process to cloak critical data according to an embodiment of the present invention. The critical data may be a string of digits such as credit card numbers. The cloaking process may include bit randomization, bit shuffle, and encryption steps that, when taken together, cloak the critical data. As shown in FIG. 2, a hardware processor of the encryption service provider may be configured to execute applications that perform the randomization, bit shuffle, and encryption.

Figure 4:
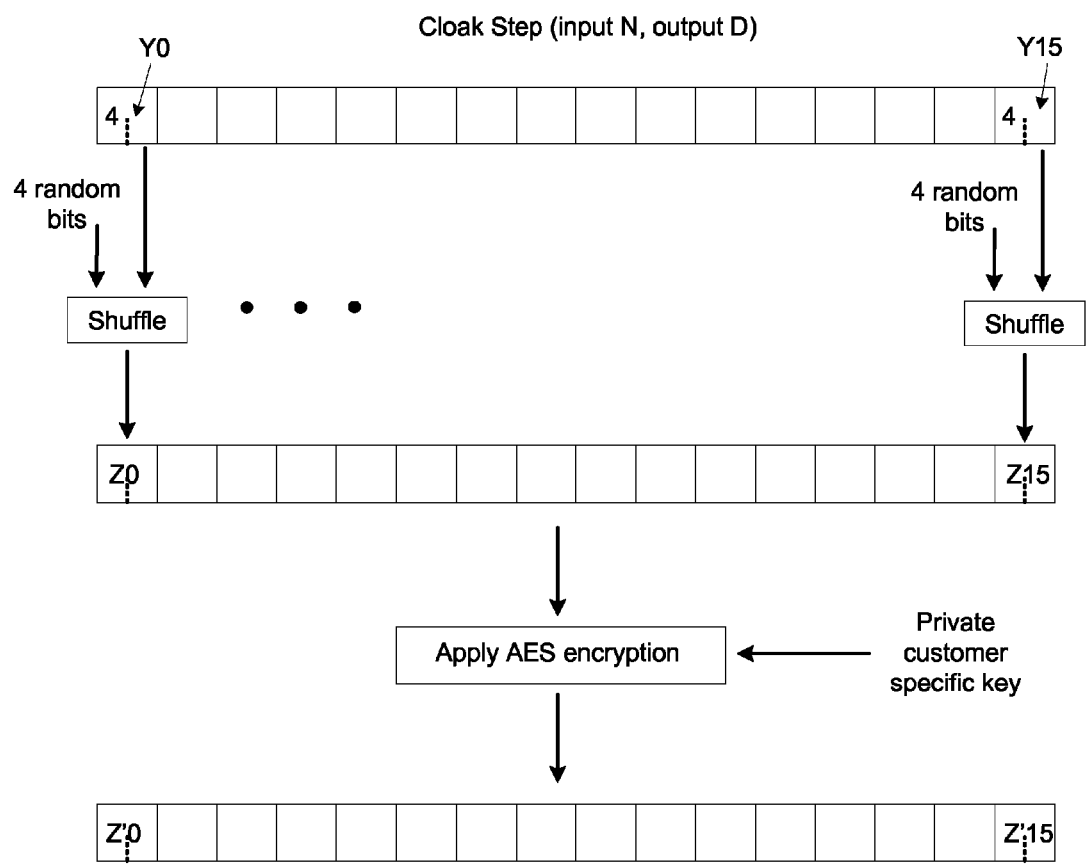
FIG. 4 illustrates a detailed process to cloak critical data according to an embodiment of the present invention.

Referring to FIG. 3, at 302, the processor of the encryption service provider may receive a string of digits such as a credit card number from the credit card company. In one embodiment, each digit may include an 8 binary bits in ASCII form. At 304, the processor may be configured to randomize a portion of the 8 bits of each integer digit. FIG. 4 illustrates a string of sixteen integer digits that may encode critical information such as a credit card number. Each digit may include eight bits. A portion of the eight bits may be used to represent the digit. For example, the lower four bits may be used as ASCII code that represents an integer digit from 0 to 9. The rest of the bits such as the higher four bits may be irrelevant for encoding the integer digit, and may be in the form of a fixed pattern such as "0100" (which equals to a decimal number 4). In one embodiment, the four irrelevant bits may be replaced with a randomized pattern of bits. As shown in FIG. 4, the higher four bits ("0100") may be replaced with a randomized pattern of 4 bits. In one embodiment, the randomized pattern may be generated by a randomizer. Thus, each digit may have a respective different randomized pattern to replace "0100." Alternatively, a single randomized pattern may replace "0100" for all digits. In yet another embodiment, less than all of the irrelevant bits are replaced with a randomized pattern. For example, 3, 2, or 1 bit of the higher four bits may be replaced with random bits. Using less than full irrelevant bits for randomization may reduce the amount of computation while still maintaining a certain level of security.

Figure 5:
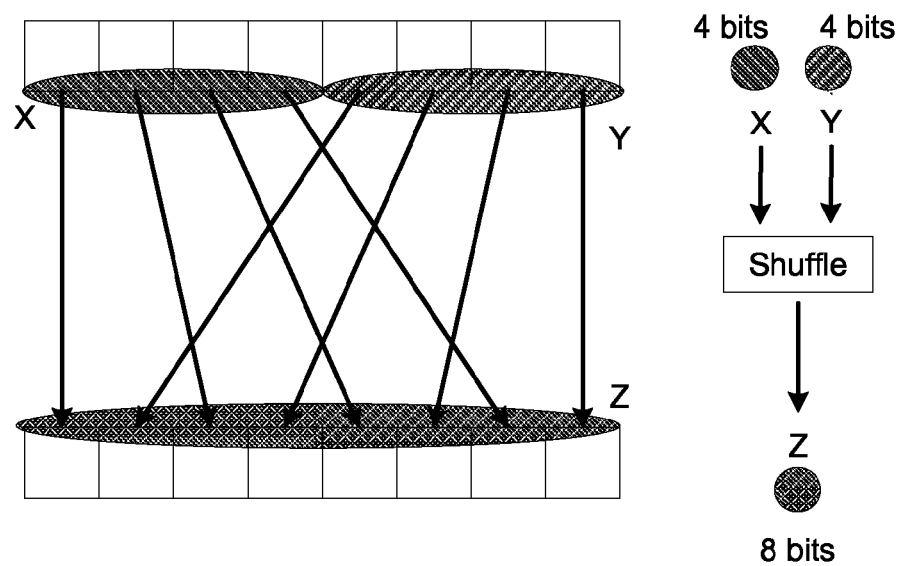
FIG. 5 illustrates a bit shuffle pattern according to an embodiment of the present invention.

After the randomization of the irrelevant bits, at 306, the randomized bits and the useful bits may be shuffled together. FIG. 5 illustrates a bit shuffle pattern according to an embodiment of the present invention. In this example, the bit positions (0, 1, 2, 3, 4, 5, 6, 7) may be shuffle to the bit positions (0, 4, 1, 5, 2, 6, 3, 7). The shuffle scheme as shown in FIG. 5 is a non-limiting example. Other one-to-one bit shuffle scheme may be similarly used to shuffle bits.

After the bit shuffle step, the original string of digits is replaced with a string of digits whose bits have been randomized and shuffled. Subsequently, at 308, the processor at the encryption service provider may be configured to execute an encryption application to encrypt the newly created string of digits using a private customer-specific key. The customer identification and the corresponding private key may be stored in a table at the encryption service provider. The encryption service provider may transmit the cloaked critical information such as credit card number to the enterprise system.

Figure 6:
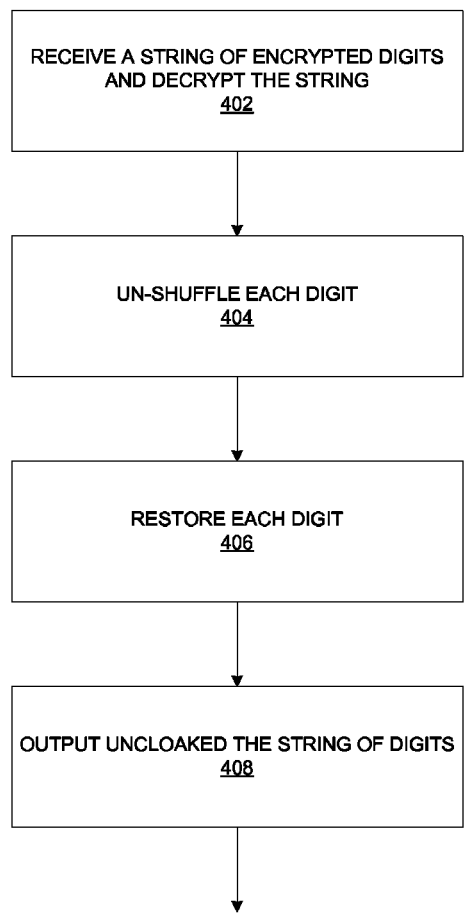
FIG. 6 illustrates a de-cloak process according to an embodiment of the present invention.
Figure 8:
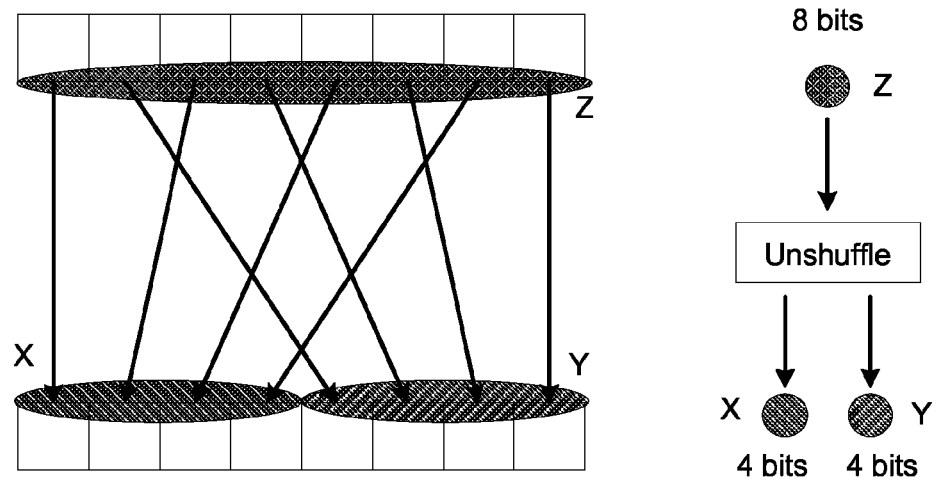
FIG. 8 illustrates a bit shuffle pattern according to an embodiment of the present invention.

A front end business application of the enterprise system may receive and store the cloaked critical information. A backend business application that is coupled to the front end business application may be configured to de-cloak the critical information (such as credit card number) before instructing the bank to pay the credit card company. FIG. 6 illustrates a de-cloak process according to an embodiment of the present invention. At 402, the backend business application may receive the encrypted data and decrypt the encrypted data using the secret key that is already stored in the backend system. The decryption method should match the encryption scheme used in the encryption of the credit card number. At 404, the bits of each digit may be un-shuffled with an un-shuffle method that matches the shuffle method as discussed above. Thus, as shown in FIG. 8, if the bits are shuffled from bit positions (0, 1, 2, 3, 4, 5, 6, 7) to bit positions (0, 4, 1, 5, 2, 6, 3, 7), the un-shuffle method would shuffle bit positions (0, 4, 1, 5, 2, 6, 3, 7) back to bit positions (0, 1, 2, 3, 4, 5, 6, 7).

After the un-shuffle of bits, at 406, the original bits may be restored by replacing those randomized bits with the original fixed pattern. Thus, the credit card number may be restored. The restored credit card number along with the calculated balance may be transmitted to the bank for payment to the credit card company.

Figure 7:
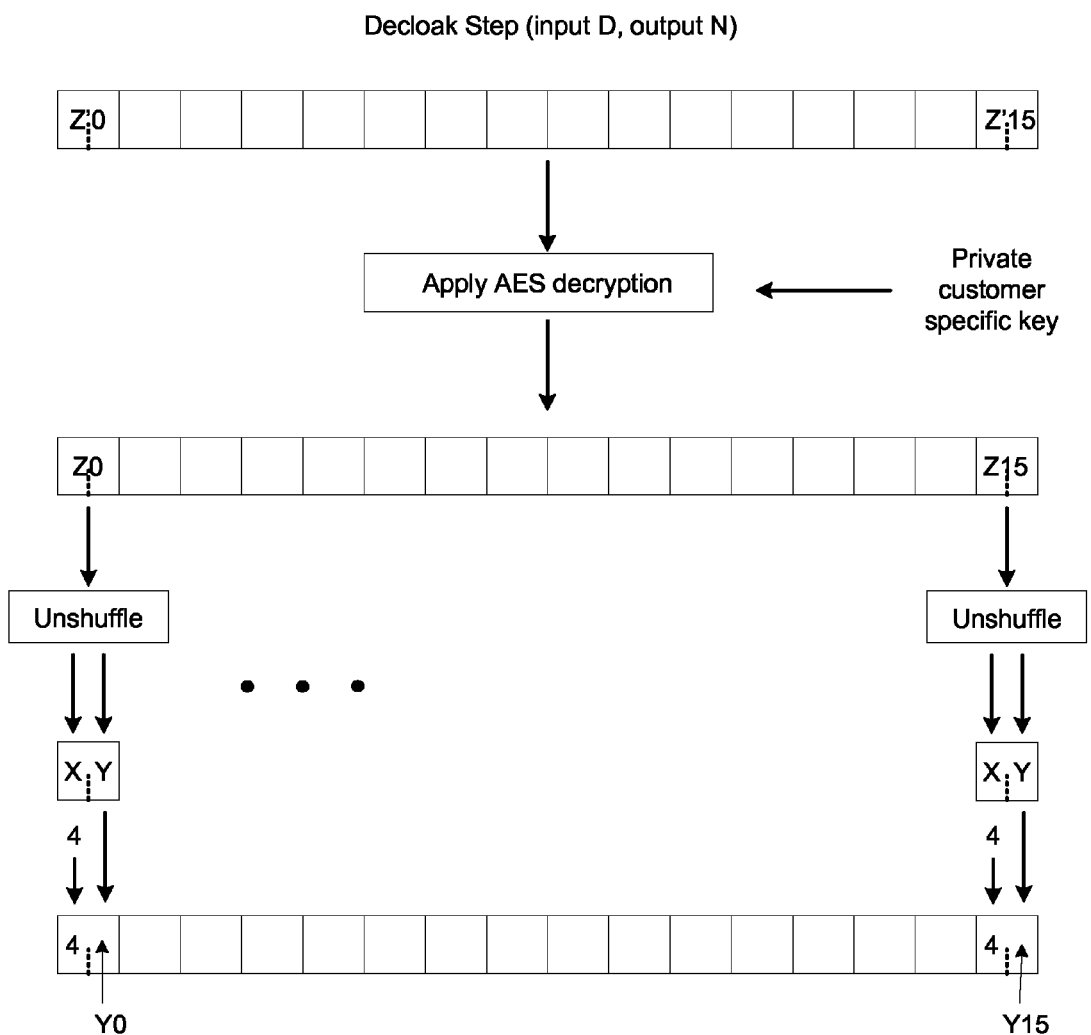
FIG. 7 illustrates a detailed process to de-cloak critical data according to an embodiment of the present invention.

FIG. 7 illustrates the de-cloak process according to an embodiment of the present invention. The de-cloak process is a reverse of the cloak process as shown in FIG. 4. As discussed above, by using the cloak and de-cloak processes, embodiments of the present invention do not need to exchange tokens between a third party and the enterprise system for each and every transaction, and thus reduces the total cost for transmitting tokens. Further, the cloaked data meet industrial standards such as the PCI standard for critical data storage and may be stored in the enterprise system.

While the cloaking method is discussed in view of critical information stored in enterprise systems, the method is not limited to enterprise systems. The cloaking method is equally applicable to the storage of critical data in other systems such as critical data in consumer systems.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A computer-implemented method for transacting credit card numbers, comprising:
    receiving, by a processor, a data object including a first string of digits representing a credit card number, each digit including N bits, where N is a positive integer;
    determining M bits out of the N bits as irrelevant bits;
    randomizing, by the processor, at least some of the M bits out of the N bits of each digit while preserving remaining bits of the N bits;
    shuffling, by the processor, the N bits of the each digit according a pre-determined pattern of bit positions to generate a second string of digits;
    encrypting, by the processor, the second string to generate an encrypted datum; and
    transmitting, by the processor, a second data object including the encrypted data to an enterprise system for securely storing the credit card number.

2. The method of claim 1, wherein the each digit includes eight bits, and wherein the higher four bits of the eight bits are substituted with random bits.

3. The method of claim 1, further comprising:
    randomizing all of the M bits.

4. The method of claim 1, comprising:
    receiving, by a processor of an enterprise system, a data object including an encrypted datum representing the credit card number;
    decrypting, by the processor, the encrypted data to generate a first string of digits, each digit including N bits, wherein N is a positive integer; and
    shuffling, by the processor, the N bits of the each digit according a pre-determined pattern of bit positions to generate a second string of digits.

5. The method of claim 4, further comprising:
    transmitting the credit card number and a payment amount to a bank for the bank to pay the payment amount to a credit card company in reference to the credit card number.

6. The method of claim 4, wherein the each digit includes eight bits, and wherein the higher four bits of the eight bits are substituted with the pre-determined bits.

7. The method of claim 4, further comprising:
after shuffling, substituting, by the processor, a subset of the N bits of the each digit with pre-determined bits to generate a third string of digits.

8. A system for securely transacting credit card numbers, comprising:
a storage having stored thereon a private key; and
a processor that is configured to:
receive a data object including an encrypted datum representing a cloaked credit card number;
decrypt the encrypted data based on the private key to generate a first string of digits, each digit including N bits, wherein N is a positive integer;
shuffle the N bits of the each digit according a pre-determined pattern of bit positions to generate a second string of digits; and
substitute a subset of the N bits of the each digit with pre-determined bits, while preserving rest of the N bits, to generate the credit card number.

9. The system of claim 8, wherein the system includes:
a front end for receiving the encrypted data from an encryption service provider; and
a backend server that includes the storage and processor.

10. The System of claim 9, wherein the frontend server operates on the encrypted credit card number to perform a business transaction for a user and the backend server transmits the credit card number to a computer in a bank for the bank to pay the payment amount to a credit card company in reference to the credit card number.

11. The system of claim 10, wherein the each digit includes eight bits, and wherein the higher four bits of the eight bits are substituted with the pre-determined bits.

12. A machine-readable non-transitory medium having stored thereon machine-executable codes that, when executed, perform a method for transacting credit card numbers, the method comprising:

receiving a data object including a first string of digits representing a credit card number, each digit including N bits, where N is a positive integer;
determining M bits out of the N bits as irrelevant bits;
randomizing, by the processor, at least some of the M bits out of the N bits of each digit while preserving remaining bits of the N bits;
shuffling the N bits of the each digit according a pre-determined pattern of bit positions to generate a second string of transformed digits;
encrypting the second string to generate an encrypted datum; and
transmitting a second data object including the encrypted data to an enterprise system for securely storing the credit card number.

13. The machine-readable medium of claim 12, wherein the each digit includes eight bits, and wherein the higher four bits of the eight bits are substituted with random bits.

14. The machine-readable medium of claim 13, the method further comprising:
randomizing all of the M bits.

15. The machine-readable medium of claim 12, wherein the method further comprises:
receiving an encrypted datum representing the credit card number;
decrypting the encrypted data to generate a first string of digits, each digit including N bits, wherein N is a positive integer; and
shuffling the N bits of the each digit according a pre-determined pattern of bit positions to generate a second string of digits.

16. The machine-readable medium of claim 15, wherein the each digit includes eight bits, and wherein the higher four bits of the eight bits are substituted with the pre-determined bits.

17. The machine-readable medium of claim 16, wherein the method further comprising:
after shuffling, substituting a subset of the N bits of the each digit with pre-determined bits to generate a third string of digits.

* * * * *